United States Patent [19]

Matsukawa et al.

[11] Patent Number: 4,937,570
[45] Date of Patent: Jun. 26, 1990

[54] ROUTE GUIDANCE DISPLAY DEVICE

[75] Inventors: Fumio Matsukawa; Yoshisada Mizutani; Hirotsugu Arai, all of Hyogo, Japan

[73] Assignee: Mitsubishi Denki Kabushiki Kaisha, Tokyo, Japan

[21] Appl. No.: 160,810

[22] Filed: Feb. 26, 1988

[30] Foreign Application Priority Data

Feb. 26, 1987 [JP] Japan .................................. 62-46013
Jul. 20, 1987 [JP] Japan .................................. 62-179240

[51] Int. Cl.$^5$ ........................... G08G 1/09; B60Q 1/00
[52] U.S. Cl. ..................................... 340/905; 340/988; 340/995; 340/994; 340/461; 340/754; 340/765; 340/286.13
[58] Field of Search ............ 340/905, 988, 995, 815.1, 340/705, 795, 765, 754, 994, 438, 461, 412

[56] References Cited

U.S. PATENT DOCUMENTS

| | | | |
|---|---|---|---|
| 3,899,786 | 8/1975 | Greubel et al. | 340/815.1 |
| 4,636,782 | 1/1987 | Nakamura et al. | 340/705 |
| 4,642,776 | 2/1987 | Matsumoto et al. | 340/988 |
| 4,646,089 | 2/1987 | Takanabe et al. | 340/988 |
| 4,677,563 | 6/1987 | Itoh et al. | 340/988 |
| 4,727,371 | 2/1988 | Wulkowicz | 340/905 |

FOREIGN PATENT DOCUMENTS 2142143 1/1985 United Kingdom ................ 340/988

Primary Examiner—Donnie L. Crosland
Attorney, Agent, or Firm—Sughrue, Mion, Zinn, Macpeak & Seas

[57] ABSTRACT

A route guidance display device for an automotive vehicle capable of displaying route patterns with a three-dimensional effect to enhance the viewer's comprehension of the road route situation being encountered. The display device includes a plurality of intersecting display segments indicative of corresponding possible route configurations. A depth-enhancing segment is included in a portion indicating the straight-ahead route. An intersection name display section may be separately included to display the name and related information regarding an intersection laying ahead.

7 Claims, 7 Drawing Sheets

ROUTE GUIDANCE DISPLAY DEVICE

BACKGROUND OF THE INVENTION

The present invention relates to a route guidance display device for road routes capable of displaying configurations and route guidance indications for special points along the road routes such as crossroads, overhead crossing, entries to or exits from freeways, overpasses such as bridges, and underpasses such as tunnels (all hereinafter collectively referred to as "route nodes").

In recent years, display devices have been developed capable of confirming the current position of a vehicle in motion for the convenience of the driver in areas with poor signposting, etc. A route guidance display device has been proposed which brings attention to the route nodes which exist on the route which the vehicle ought to be following and makes a display of the configurations of the various route nodes together with an indication of the route the vehicle should take immediately before coming to such nodes. Examples of a device of this kind using LCD displays are noted in such publications as the Technical Report of the Television Institute, ED-409, IPD 37-12 "Liquid Crystal Display Device for Automobiles" (Nov. 17, 1978) and The Fifth International Conference on Automotive Electronics, C-201/85 (Oct. 29, 1985), "A Self-Supporting Modular Navigational System for Automobiles". In both cases, a monochrome planar radial arrow pattern is used to indicate the configuration of flat plane intersections and the direction the driver should take.

In the existing devices mentioned above there is a problem in that using an arrow pattern makes it difficult to display route nodes other than flat plane intersections, for example, the configuration of an overhead crossing point, or the direction that should be taken at such a crossing.

A variety of route guidance display devices have been proposed which give the driver advance warning of the direction to be taken at intersections and the name of the intersection. In general these consist of directions displayed on top of map data which is displayed on a display device (hereafter "display"). Other types provide a separate route guidance display device in addition to such display, but in such case the name of the intersection is not displayed.

In, for example, the route guidance display device published in Japanese Laid-Open Patent No. 1986-66920, a map is shown on the display, and as the vehicle passes through an intersection on the map, the name of the intersection is displayed on the display.

FIG. 1 shows a route guidance display device or prior art published in the above-mentioned Technical Report of the Television Institute article. In the figure, 20 is a liquid crystal pattern showing the configuration of an intersection. A liquid crystal device having this kind of display pattern is fitted on the dashboard, and is able to display the configuration of intersections and route directions only.

With such route guidance display devices in the prior art, the name of an intersection on the route is shown on the display on top of the map, and only the configuration of the intersection and route guidance are shown separately. In the above case, the driver has to read information from the display a task which is more difficult the more detailed the map is, and it takes some time to obtain the information required. Moreover, the display usually uses a CRT (cathode-ray tube), which is placed under the dashboard owing to its shape, requiring the driver to shift his line of sight considerably in order to read it while driving. On the other hand the route guidance display device shown in FIG. 1 is installed above the dashboard requiring a minimal shift in the line of sight to be read. However, since this display does not give the name of an intersection, it is difficult for the driver passing through a town with many intersections to be sure which intersection the displayed pattern actually refers to. These problems interfere with the process of safe driving.

SUMMARY OF THE INVENTION

The present invention is intended to overcome the above problem, and its purpose is to provide a route guidance display device able not only to display the configuration of and direction to be taken at an overhead crossing, but also to make a much clearer display than in existing devices of the configuration of and direction to be taken at a flat planar traffic intersection, and which is capable of displaying both the normal route to be taken and indicating an overshoot error.

The traffic route guidance display device of the invention has a plurality of road patterns intersecting in a three-dimensional perspective and divided into a number of separate display segments capable of two or more displays.

In the route guidance display device according to this invention the display segments are combined as required, differing displays being made with this combination of display segments, the desired route node configuration and the route guidance indication being displayed three-dimensionally.

The route guidance display device in accordance with another aspect of the present invention integrates a display section showing the configuration of an intersection with a display section showing the name of the intersection, and is provided separately to the display showing map data and the like. That is, according to the invention information inputted from a data processor on the configuration of intersections route guidance and the names of intersections is displayed.

DESCRIPTION OF THE PREFERRED EMBODIMENTS

Figure 1:
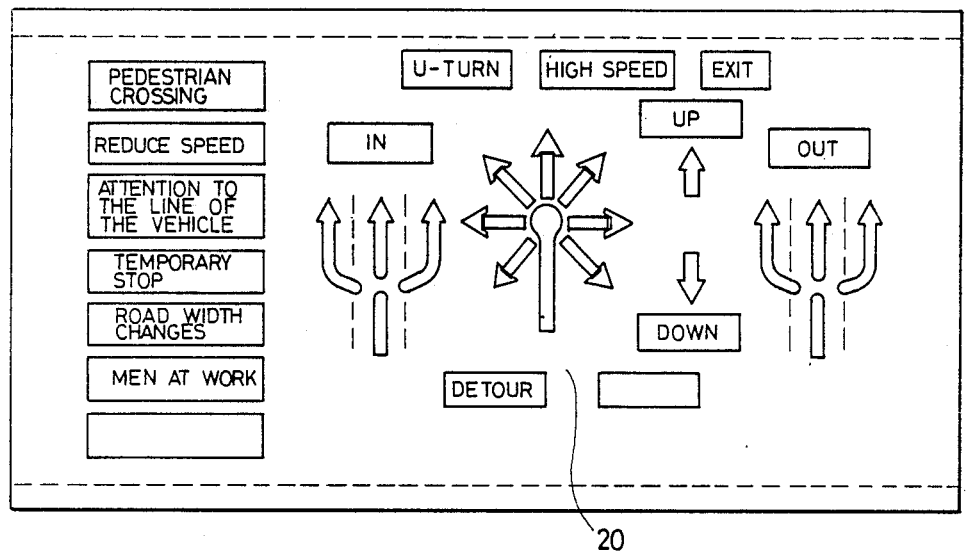
FIG. 1 is an example of a display pattern prior art.
Figure 2:
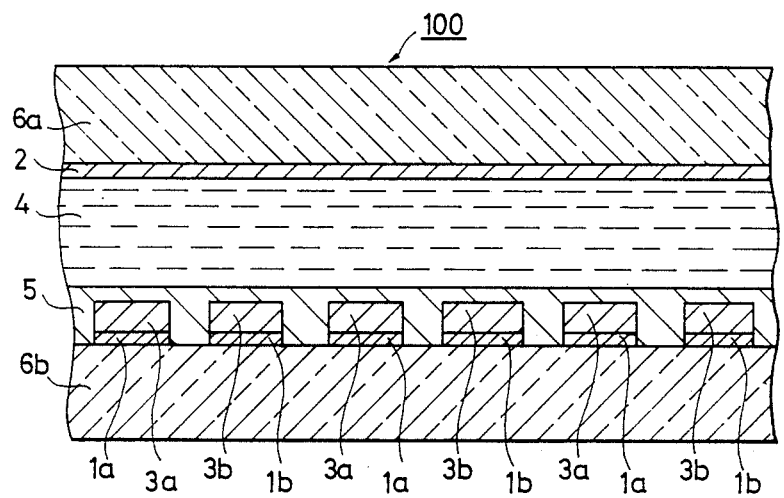
FIG. 2 is a cross-section showing part of a preferred embodiment of the invention.

Referred embodiments of the invention will now be explained with reference to the drawings. FIG. 2 is a cross-section showing part of the route guidance display device according to a first preferred embodiment of the invention. In this figure, 1a and 1b are common terminals of an interdigital configuration arranged alternately, and 2 is a segment terminal. 3a and 3b are color filters of, for example, red and blue, provided respectively on top of common terminals 1a and 1b, and arranged to match with the interdigital configuration of the common terminals 1a and 1b. 4 is a liquid crystal layer, and 5 is an insulating film interposed between the color filters 3 and the liquid crystal layer 4. 6a and 6b are opposing transparent bases Lead-out terminals for the segment terminal 2 and the common terminals 1 (not shown in the figure) are arranged on a transparent base 6a, and common terminals 1a and 1b are arranged on a transparent base 6b.

Figure 3:
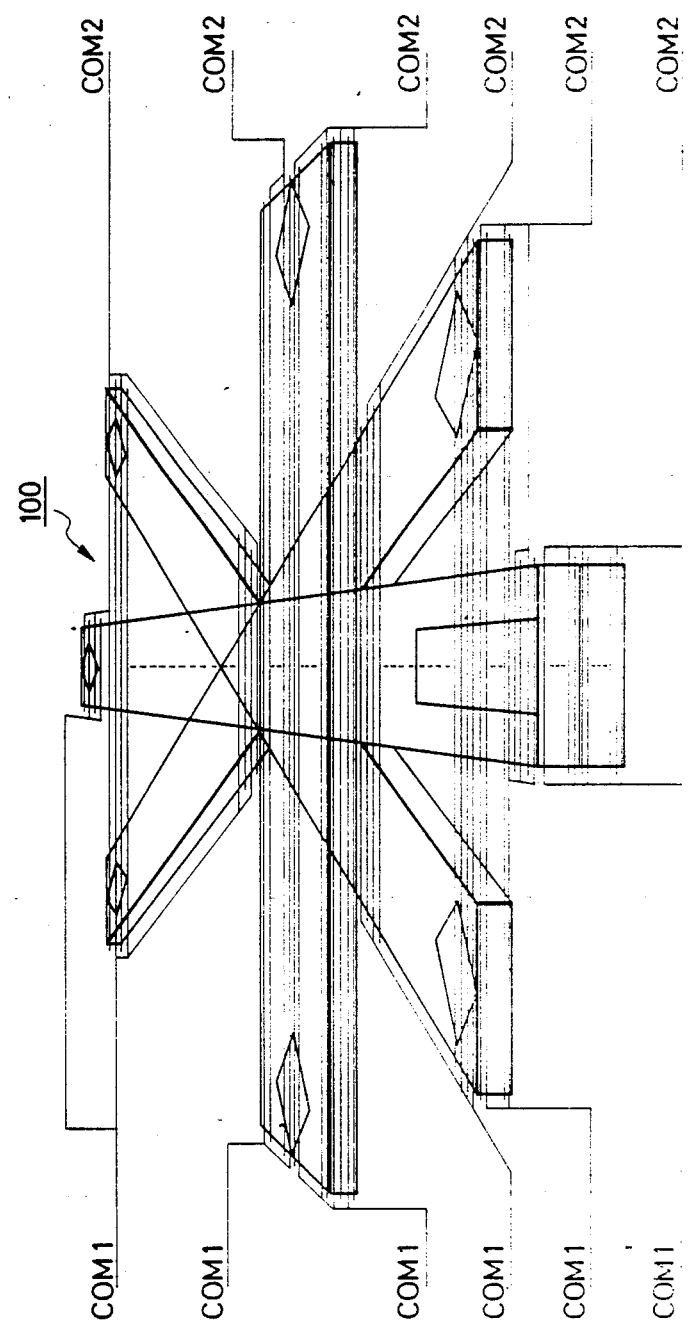
FIG. 3 is a simplified and schematic diagram of terminal patterns according to this preferred embodiment of the invention.

When a liquid crystal panel 100, which is the liquid crystal part of the route guidance display device, is being used in the display, for example, when using a twisted nematic liquid crystal layer having true dielectrical anisotropism as the liquid crystal layer 4, two polarized panels (not shown) are arranged on either side of the liquid crystal panel and at right angles to one another to cut out light from behind, for example, light from a fluorescent lamp. The route guidance display is then constituted by applying the required voltage to the liquid crystal layer 4 between the segment terminal 2 and the common terminals 1 through lead-out terminals (not shown). When the required voltage is applied to the liquid crystal layer 4, the configuration of the segment terminal 2 (hereafter called the "segment pattern") lights by allowing light to pass therethrough. Thus, if the interdigital pitch of the common terminals 1 is sufficiently small in comparison to the segment pattern, the liquid crystal panel 4 will show, if viewed from the side opposite the fluorescent lamp, a red segment pattern if the common terminals 1a are selected and a blue segment pattern if the common terminals 1b are selected, or a color that is a combination of red and blue if both 1a and 1b are selected FIG. 3 shows a simplified schematic-diagram of the terminal patterns in the route guidance display device according to this embodiment of the present invention. In FIG. 3, COM1 corresponds to the common terminals 1a shown in FIG. 2, and COM2 to the common terminals 1b in FIG. 2.

Figure 4:
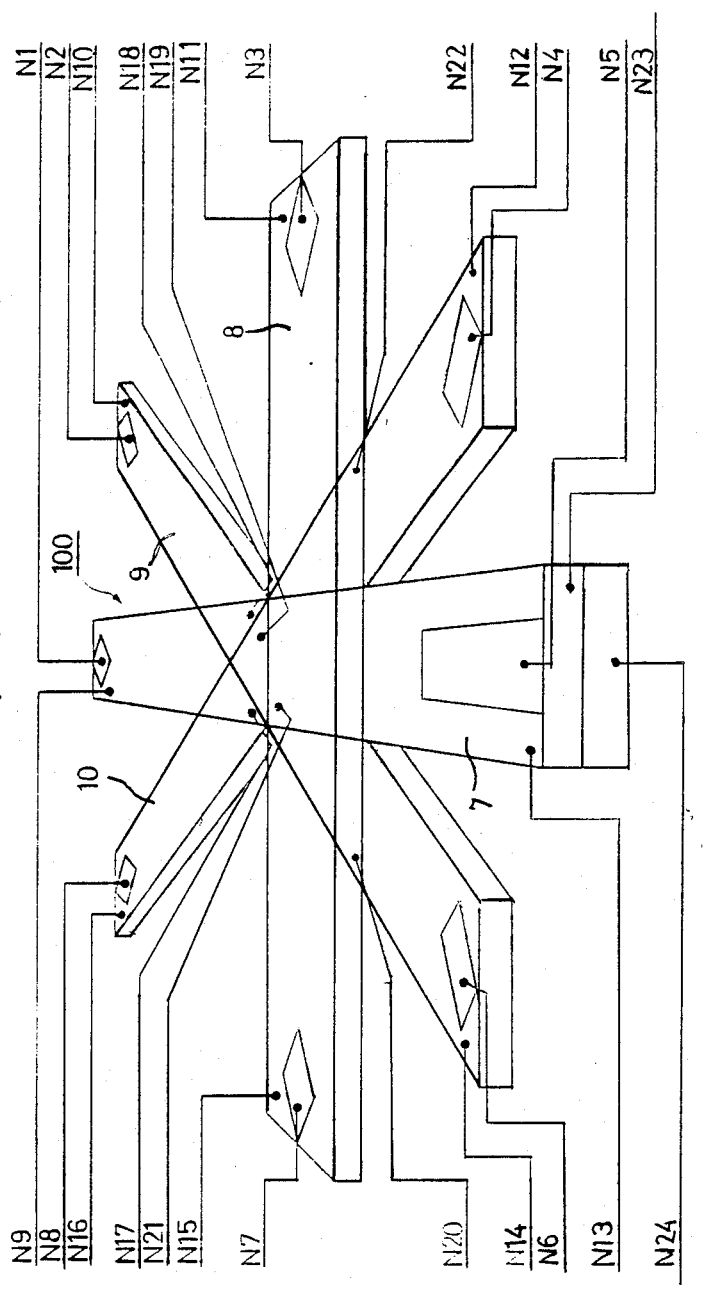
FIG. 4 shows the display segments of the above preferred embodiment of the invention.

FIG. 4 shows the segment display in the route guidance display device according to this embodiment of the present invention. In this figure N1-N24 are the various display segments. By combining any of these segments N1-N24 appropriately, it is possible to obtain a color display of the configuration of route nodes and the vehicle's route guidance indication. 7 is the straight-ahead route pattern. To create a depth effect, two layers, display segment N23 and depth enhancer display segment N24, are provided at the end surface of the vehicle approach side. 8 is an intersecting route pattern crossing the straight-ahead route pattern 7 at right angles, 9 is a primary diagonal route pattern veering to the right and away from the intersecting route pattern 8 at approximately 45° and 10 is a secondary diagonal route pattern running at 45° in the reverse direction. Diamond or rectangularly shaped display segments N1-N9 provided on both surfaces of each route pattern 7-10 indicate the route the vehicle should take. The rectangularly shaped display segment N5 is used to indicate that the vehicle is still some distance from the intersection. The display segments N10-N16 provided on each side of the route patterns 7-10 display those parts of the route patterns 7-10 which do not intersect. Display segments N17 and N18 are parts where the straight-ahead route pattern 7 intersects respectively with the secondary diagonal route pattern 10 and the primary diagonal route pattern 9, a display segment N19 being the part where the three route patterns 7, 9 and 10 intersect. Display segments N20 and N22 are parts where the intersecting route pattern 8 intersects respectively with the primary diagonal route pattern 9 and the secondary diagonal rout pattern 10, display segment N21 being the point where all the route patterns 7-10 intersect that is, a multi-crossing. Each display segment N1-N24, constituted as shown in FIG. 4, is capable of a three-color display, and each is operated by a separate control circuit (not shown in the figure). As noted above, in accordance with the present invention a plurality of route patterns in a three-dimensional perspective are made to intersect in accord with a plurality of three dimensional roads, with both intersecting and nonintersecting parts being display segments and furthermore being provided with route guidance display segments.

Figure 5A:
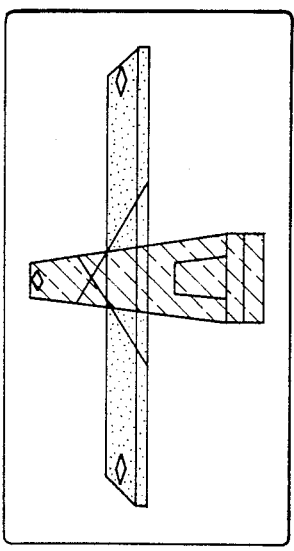
FIGS. 5A–9 show examples of the display patterns in the route guidance display device in this invention.
Figure 5B:
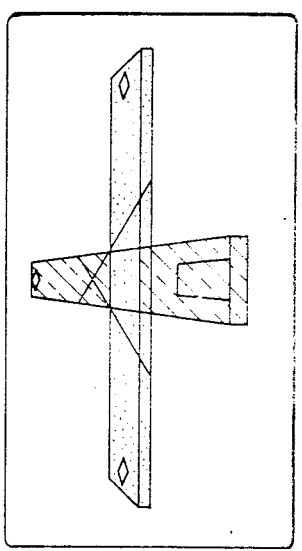

FIGS. 5A-9 show examples of various operational displays for the route guidance display device of the above construction. FIG. 5A shows the case where the road passes over another road, and FIG. 5B shows the case where it passes under another road. The road ahead is shown, in, for example, blue (represented by broken diagonal shading in subsequent figures), and the intersecting overpass or underpass is in, for example, the combination color (represented by dots in subsequent figures). Route guidance may be indicated by having the diamond-shaped display segment N1 in the route pattern segment showing the route flash on and off. When the road ahead passes over another road, the display segment N24 lights up together with display segment N23 to enhance the display of depth. In order to form the display shown in FIG. 5A, the 10 separate display segments N1, N5, N9, N13, N17, N18, N19, N21, N23, and N24 are blue, and the six separate display segments N3, N7, N11, N15, N20 and N22 are of the combination color. To form the display shown in FIG. 5B, the eight separate display segments N1, N5, N9, N13, N17, N18, N19, and N23 are blue, the seven separate display segments N3, N7, N11, N15, N20, N21 and N22 are of the combination color.

Figure 6A:
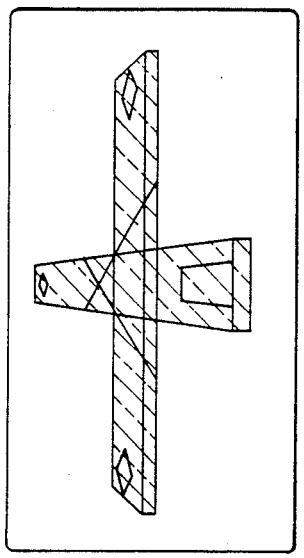
Figure 6B:
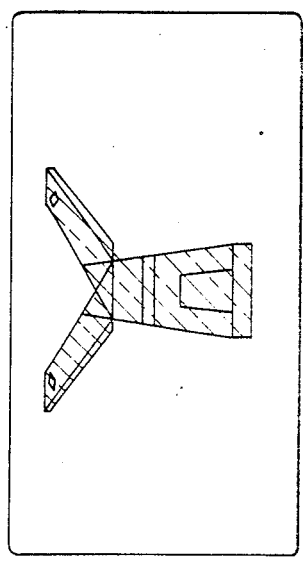

FIG. 6A shows a road intersection, and FIG. 6B a fork, both displays being in, for instance, blue. In the case of the fork display, the 11 separate display segments N2, N5, N8, N10, N13, N16, N17, N18, N19, N32 and N23 may be shown in blue.

Figure 7A:
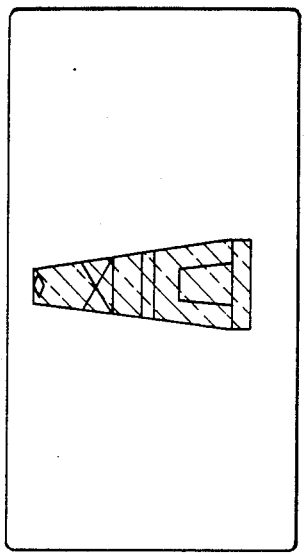
Figure 7B:
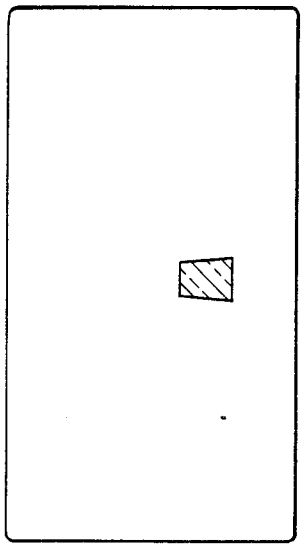

FIG. 7A shows an example of the display when the vehicle is still some distance from an upcoming intersection, and the rectangular display segment N5 alone is displayed in, for example, blue. FIG. 7B shows the configurational display for the intersection when the vehicle is approaching the intersection, together with an example of the route guidance indication showing that the vehicle should turn right. Here, the eight separate display segments N1, N7, N9, N15, N17, N18, N19, and N20 are displayed in, for example, red (represented by diagonal shading in subsequent figures), and the seven separate display segments N3, N5, N11, N13, N21, N22 and N23 showing the route to be taken are displayed in, for example, blue. A flashing display for the diamond-shaped display segment N3 to further emphasize the route will make the display even clearer.

Figure 8:
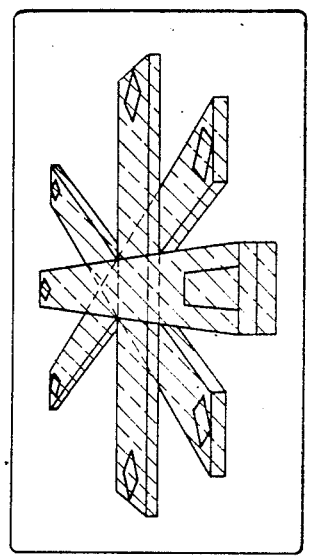

FIG. 8 shows the road straight ahead, and the nine separate display segments N1, N5, N9, N13, N17, N18, N19, N21 and N23 are displayed in, for example, blue. A flashing display for the diamond-shaped display segment N1 to further emphasize the route will make the display even clearer.

Figure 9:
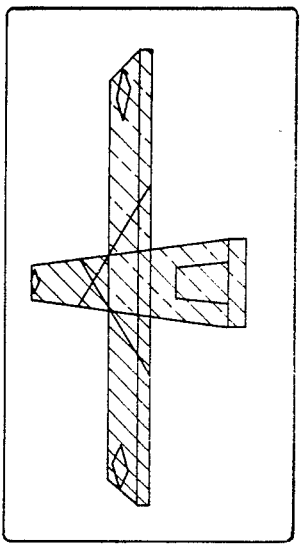

FIG. 9 shows an example of a display to warn the driver that he has left his road when the vehicle has failed to follow the route indicated by the route guidance display device, all segments N1–N24 being displayed in, for example, red.

As explained above, the present invention is constituted so that a plurality of road patterns are made to intersect in a three-dimensional perspective, being divided into many parts and arranged as display segments able to make differing displays. The invention has the effect of making possible not only a display of route node configurations and route guidance indications that are much clearer than in the prior art, but also, through the provision of a depth enhancer segment to enhance the sense of depth, enables a display to be made of the configuration of an overhead crossing and its respective route guidance indication, which has been impossible in prior art.

Figure 10:
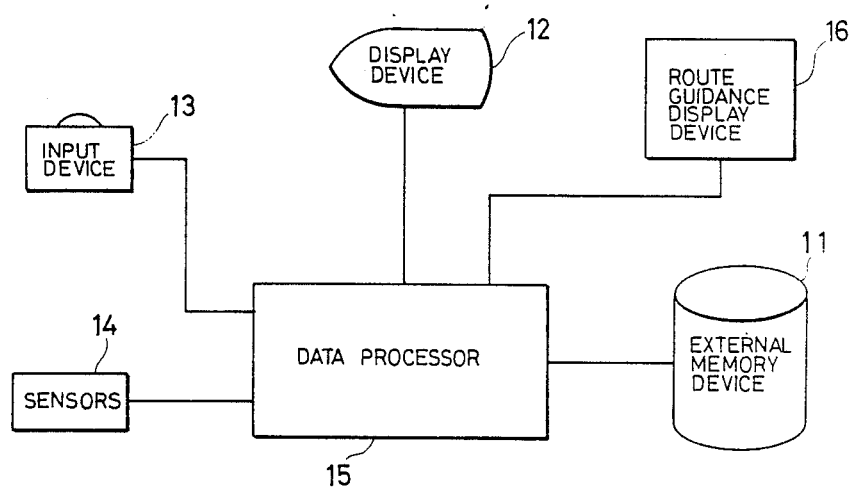
FIG. 10 is a schematic diagram of a system using the route guidance display device according to another embodiment of the invention.

Another embodiment of the invention will now be described with reference to the drawings. FIG. 10 is a block diagram showing the layout of a system using the route guidance display device according to the invention. In this figure, 11 is an external memory programmed with map data, 12 is a display which displays maps and the like, 13 is an input device which inputs the starting point and destination onto the maps displayed on the display 12, 14 are sensors such as direction sensors and distance sensors, 15 is a data processor which processes map data from the external memory 11, data from the input device 13 and data from the various sensors 14 in order to calculate the current position of the vehicle, directions, etc. 16 is a route guidance display device which is connected to the data processor 15.

The operation of this embodiment will now be explained with reference to FIG. 10. When the system is activated the data processor 15 reads the map data corresponding to a map of appropriate area from the external memory 11 and outputs it onto the display after performing the requisite processing. After enlarging, condensing or otherwise freely selecting the desired area from this map, the driver inputs the starting point and destination using an input device 13 such as a trackball. He then further inputs, in the same manner as above, the route to be taken from the starting point to the destination, using an input device such as a trackball. Alternatively, the route from the starting point to the destination may be determined by the data processor.

In this way, when the journey begins, the data from the sensors 14 is processed and the current position of the vehicle detected so that when the current position comes to within a predetermined distance, for example, 100 m, of an intersection on the route preset above, the configuration of the intersection and the set route guidance data are output to the route guidance display device 16.

The data output to the route guidance display device according to the invention will now be described.

Figure 11A:
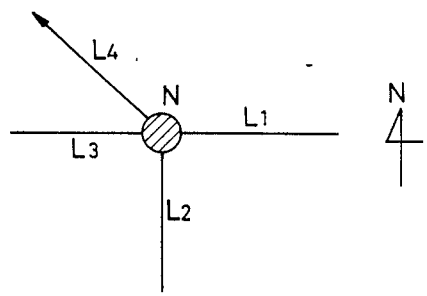
FIGS. 11A and 11B show information displayed on the route guidance display device of this embodiment of the invention together with an example of its operation.

FIG. 11A shows an example of an intersection. Assuming that the vehicle approaches from road L1 and wishes to pass through the intersection N onto the road L4, when the vehicle approaches to within a predetermined distance, for example 50 m, of the intersection N, the data relevant to intersection N is read out from the external memory 11 in FIG. 10, and from this is selected directional data for the roads meeting at the intersection N. This direction data shows the direction in which roads lead out from the intersection N, and is expressed using eight directions numbered clockwise with 1 as due north. In the example shown in FIG. 11A, road L1 is direction 3, road L2 is direction 5, road L3 is direction 7, and road L4 is direction 8. The configuration of the intersection N can also be obtained by reading out the directional numbers in the reverse order.

Figure 11B:
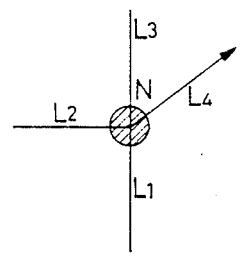

The configuration of the intersection so obtained is not the view of the configuration of the intersection as seen from the vehicle on the road it is travelling. The configuration is rotated about its center, which is taken to be the intersection (N), so that the road the vehicle is on comes to the bottom. In FIG. 11A, this means that road L1 will be rotated about the center of the intersection N to come to the bottom, as shown in FIG. 11B. The route guidance is taken from the data relating to the selected route, and is output to the route guidance display device. The name of the intersection is also extracted from the data relating to intersection N and output to the route guidance display device.

Figure 12:
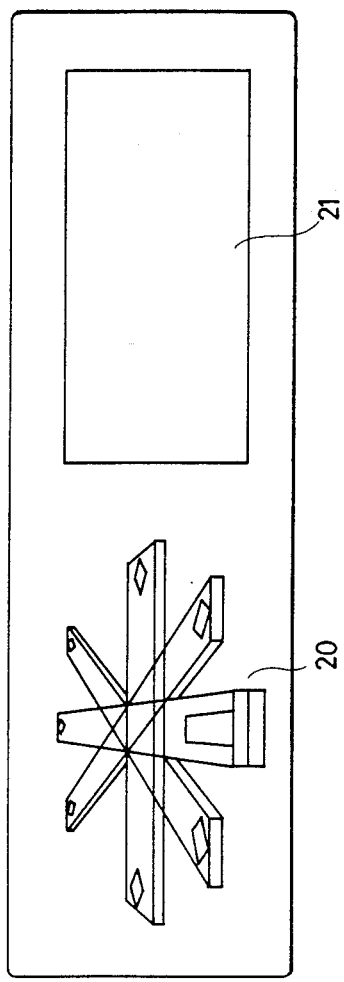
FIG. 12 is a diagram of the display pattern for the route guidance display device in the invention.

FIG. 12 shows the display pattern 20 of the route guidance display device according to the invention. In the figure, elements 20 are the segment patterns, which are able to display the configuration of the intersection and route guidance, and 21 is a dot matrix pattern composed of, for example, 100×36 dots, which can display the name of the intersection.

The segment pattern areas of the liquid crystal panel used as the display panel in this embodiment of the invention can use, for example, two-color fine stripe color filters to which is fitted a pair of comb-shaped common segment terminals which determine the display pattern and a twisted nematic type liquid crystal layer. This enables a display of three colors to be made, one color created by applying a certain voltage between one set of common terminals and segment terminals, another color by applying a set voltage between the other set of common terminals and segment terminals, and a combination color created by applying a set voltage across both sets of common terminals and the segment terminals.

The dot matrix areas are composed of the two-color stripe filters to which are matched a pair of scanning terminals (36×2 in the case of FIG. 12), signal terminals arranged perpendicular to these (100 in the case of FIG. 12) and a twisted nematic liquid crystal layer as mentioned above. The scanning terminals, which correspond to all three colors, can display each color independently or a combination color by activating both colors at once.

As explained above, the liquid crystal display panel used in the invention combines in one panel the segment pattern area, which displays the configuration of an intersection and route guidance, and the dot matrix area, which displays the name of the intersection. It is possible to have each area display a different color.

Figure 13:
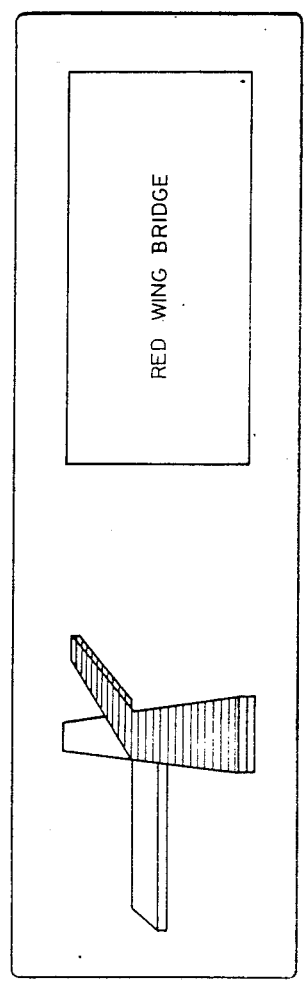
FIG. 13 is a diagram showing an example of the display of the route guidance display device in this embodiment of the invention.

FIG. 13 shows an example of an actual display for the intersection shown in FIG. 11B. In this figure, the configuration of the intersection is shown by the white segment pattern, and the route to be taken by the hatched segment pattern. This is intended to represent the intersection configuration segments and the route guidance segments display in different colors. The dot matrix section shows, for example, as shown in the figure, a display of the name of the intersection "Red Wing Bridge". Furthermore, in the case where this intersection is very congested, the color of the display of the name of the intersection can be changed to warn the driver in advance to make a detour by means of information outputted from the sensors 14 to the data processing means 15. Likewise, information from the sensors may be used to provide the driver with information regarding the best route to a destination.

As explained above, the invention has the effect of limiting the displayed information to the configuration of an intersection and its name, together with route guidance, and is provided separately to the display of map data. Hence, not only can the configuration of the next intersection and route guidance be read at a glance, but also the intersection on the route to which the displayed pattern refers can be easily identified due to the fact that the name of the intersection is displayed at the same time as its configuration. Furthermore, if the device is installed on the dashboard, the driver will not have to shift his line of sight so far to see it, leading to increased safety on the road.

What is claimed is:

1. An on-board route guidance display device for a motor vehicle comprising: a plurality of display segments arranged in pattern corresponding to a predetermined road route pattern, said display segments intersecting at a predetermined position, and display segments being arranged to provide a viewer with a perception of depth, at least two of said display segments in a position corresponding to a straight-ahead route being stacked one on the other for providing a depth-enhancing effect; and a plurality of route guidance indicators arranged upon at least predetermined ones of said display segments, wherein said display segments can be activated in a desired combination to indicate a pattern of road routes being encountered by said vehicle.

2. The route guidance display device of claim 1, wherein said road route patterns include both plane intersecting patterns and overpass intersecting patterns.

3. The route guidance display device of claim 1, wherein said at least two of said display segments are of different display colors.

4. In a route guidance display system for a motor vehicle, said route guidance display system having an external memory programmed with map data including intersections and main routes, a display device for displaying said map-data, an input device for inputting a starting point and a destination onto a map displayed on said display device, sensor means for detecting a distance and direction of travel of said vehicle, and data processing means for processing display data based on map data from said external memory, data inputted from said input device, and information outputted from said sensors to provide a driver information regarding the current position of said vehicle, congestion on said main routes, a best route to said destination, and a configuration and name of a next intersection; and a route guidance display device comprising: an intersection configuration display section for displaying said configurations of intersections, and an intersection name display section for displaying said names of intersections, both said display sections being provided on a common display panel having a predetermined number of display colors, said intersections configuration display section being separate from said device for displaying said map data.

5. The route guidance display system of claim 4, wherein said display panel comprises a liquid crystal display panel.

6. The route guidance display system of claim 5, wherein said predetermined number of display colors in two display colors inclusive of combinations of said two display colors.

7. The route guidance display system of claim 5, wherein said intersection configuration display section comprises a plurality of segment patterns, and said intersection name display section comprises a plurality of dot matrix patterns.

* * * * *